E. R. BAILEY.
CREAM SEPARATOR LINER.
APPLICATION FILED SEPT. 24, 1908.
945,903.
Patented Jan. 11, 1910.
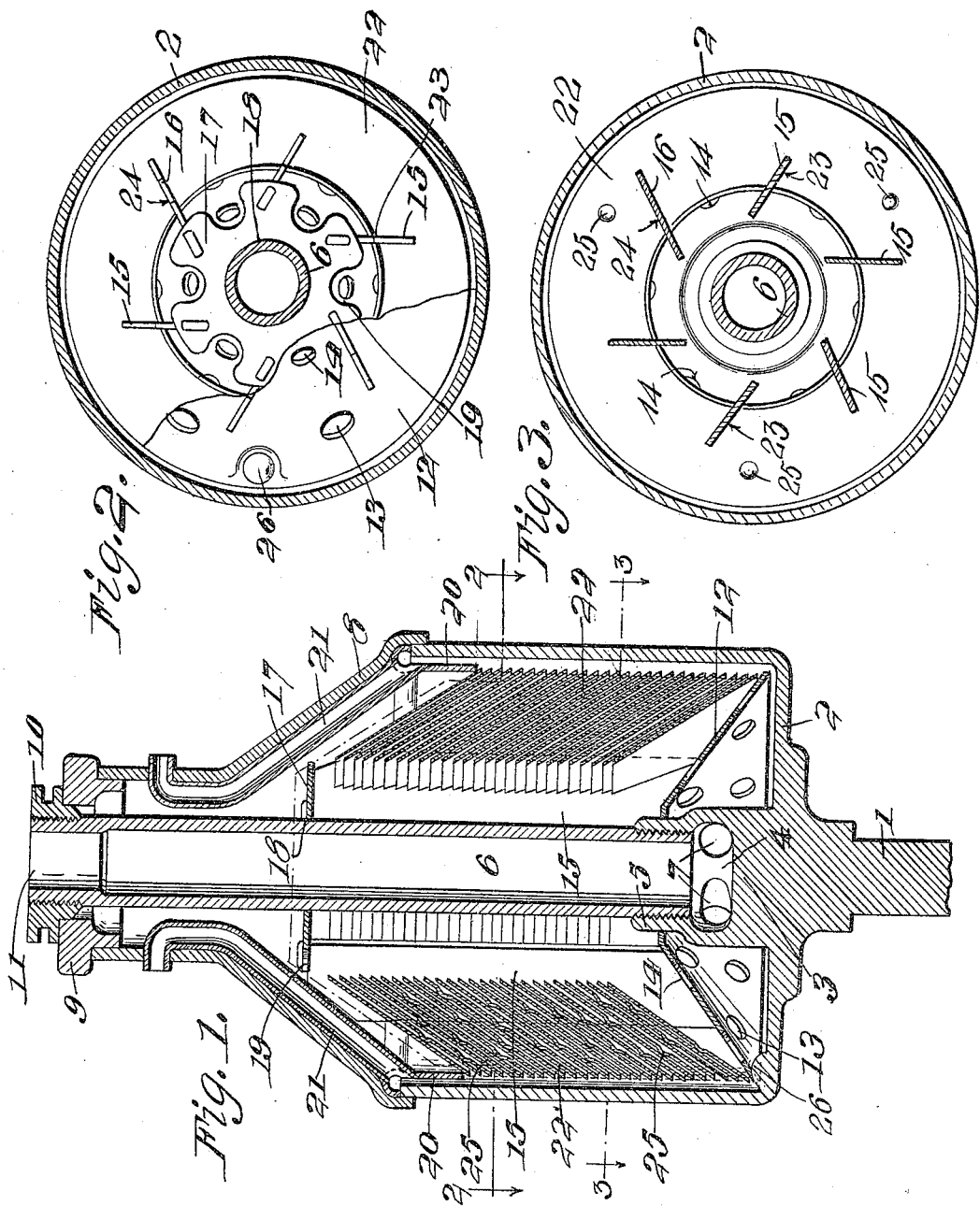
Witnesses
C. D. B. Brown.
C. H. Giesbauer.
Inventor
E. R. Bailey
By H. B. Willson & Co.
Attorneys

UNITED STATES PATENT OFFICE.

EDGERLY R. BAILEY, OF CLARINDA, IOWA.

CREAM-SEPARATOR LINER.

945,903.

Specification of Letters Patent.   Patented Jan. 11, 1910.

Application filed September 24, 1908. Serial No. 454,500.

*To all whom it may concern:*

Be it known that I, EDGERLY R. BAILEY, a citizen of the United States, residing at Clarinda, in the county of Page and State of Iowa, have invented certain new and useful Improvements in Cream-Separator Liners; and I do declare the following to be a full, clear, and exact description of the invention, such as will enable others skilled in the art to which it appertains to make and use the same.

This invention relates to separators, and particularly to centrifugal cream separators.

The object of the invention is the provision of a device of this character which will prevent any lagging in the strata of milk as it passes from the feed opening to the exit, thus obtaining a uniform separation and a higher cream percentage.

With these and other objects in view, the invention consists of certain novel features of construction, combination and arrangement of parts, as will be more fully described and particularly pointed out in the appended claims.

In the accompanying drawings, Figure 1 is a central vertical section; Fig. 2 is a horizontal section taken on the line 2—2 of Fig. 1, and Fig. 3 is a sectional view taken on the line 3—3 of Fig. 1.

Referring more especially to the drawings, 1 represents the shaft of a separator which is driven in any suitable manner, and is preferably connected integral with the bowl 2, as shown. Inside of the bowl the casting is made sufficiently heavy to include a neck or projection 3, which is hollowed out at 4, and threaded at 5, to receive the inlet tube 6. The socket 4 is apertured at 7, to permit the passage of the milk to the bowl. At the upper end of the bowl I provide a suitable cover or cap 8, which is held in position upon the bowl by a retaining ring 9, held against the cap of a set screw 10, threaded on to the upper or inlet end 11 of the tube 6. Inside of the bowl and surrounding the neck 3 is a perforated cone-shaped disk 12, having an outer and inner row of perforations 13 and 14, the former being adapted to permit the passage of milk, and the latter being arranged higher up adjacent the center of the disk for the passage of the cream. Extending vertically from the cone 12 and rigidly secured thereto are a plurality of tangentially extending vanes 15, one of which 16 is somewhat wider than the others for a purpose which will be hereinafter described. These vanes are all riveted or otherwise secured to the cone 12 and extend up with their inner edges parallel with the tube 6, and with their tangential direction of extension intersecting the radial lines at approximately the vertical center of their bodies. The upper ends of these vanes are securely riveted to a disk 17, which is apertured at 18, to permit the passage of the tube 6. This disk tightly engages the tube 6, and is cut away intermediate the vanes 15 as at 19 to permit the passage of the cream. In this construction of separator, I secure between the cap and the upper edge of the bowl the usual skimming ring 20, which is provided with the outlet tubes 21, of any suitable number. The cream outlet opening is not shown herein, but may be located at any point which is deemed advisable.

Secured to the vanes 15 are the usual liner plates 22, which are slotted at 23, to receive the vanes when they are slipped into place. Each liner plate is also provided with a slot 24, to receive the vane 16, and in this manner the vanes and liner plates are held securely within the bowl. In assembling the device, the liner plates being provided with the slot 24 can only be fitted in the correct manner, the wide vane acting as a guide to prevent incorrect assembling. Each liner plate is provided with a plurality of punched up knobs, 25, which hold the same in separated position, as will be clearly seen from an inspection of Fig. 1.

While the cone 12 is tightly secured upon the neck 3, I preferably engage the same with a stud 26, which is carried by the bottom of the bowl and positively prevents the cone 12 and its connected parts from turning.

In the operation of the device, milk is fed from the upper end 11 of the tube 6 to the recess 4 and from thence through the openings 7 into the bowl 2 under the cone 12. The milk is then thrown out under the effect of the centrifugal force, the cream immediately escaping through the apertures 14 and the milk through the outlets 13. As the milk rises in the bowl from constant feeding, the vanes 15, it will be seen, are arranged so as to intersect the radial lines and to increase the efficiency of the device, acting upon the milk to overcome the inertia and prevent lagging of the different stratum between the separate liner plates. The cream rises through the center of the bowl adjacent the tube 6 and passes around through the cutaway portions 19 to its outlet (not shown).

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters-Patent is:—

1. In a centrifugal liquid separator, a liner comprising rigidly connected end and intermediate members, and a series of loosely mounted nested conical liner plates or rings located intermediate said end members and engaged with said connected members.

2. In a centrifugal liquid separator, a liner comprising rigidly connected end and intermediate members, a series of loosely mounted nested conical liner plates or rings located intermediate said end members and movable with the said connected members, and means for preventing the rotation of said conical plates or rings which at the same time permits a free longitudinal movement thereof.

3. A liner for centrifugal liquid separators, comprising a series of obliquely disposed circularly arranged bars, annulus disk members at the respective ends thereof rigidly secured thereto and the same forming a unitary centering cage, and a series of conical superposed nested annulus plates loosely mounted around and movable lengthwise of said bars.

4. In a centrifugal separator, the combination with a bowl, of a socket formed in its base, a central feed pipe secured in said socket, a cone seated in said bowl around said socket and having cream and milk apertures, a plurality of liner plates arranged in vertical sequence above the cone and surrounding said feed tube, said liner plates being provided with a plurality of different sized slots, vertically extending vanes secured to said cone and arranged tangentially to the inlet tube, said vanes secured in the slots of the liner plates, a disk tightly engaging said inlet tube and connected with said vanes to hold the upper end thereof in proper alinement, said disk having a plurality of notches vertically alined with the cream apertures, a cap for the bowl, and means carried by the feed pipe for holding the cap in position on the bowl.

5. In a centrifugal separator, the combination with a bowl, of a cone resting on the bottom of the bowl and having a plurality of cream openings, a plurality of vertically arranged vanes supported on the cone and arranged alternately with the cream openings, a notched disk secured to the upper end of said vanes to hold the same in spaced relation, the notches in the disk being vertically alined with the cream openings, and liner plates surrounding the vanes and secured thereto.

In testimony whereof I have hereunto set my hand in presence of two subscribing witnesses.

EDGERLY R. BAILEY.

Witnesses:
MINNIE POTTS,
C. F. BUTLER.